US006387478B2

(12) United States Patent
Fujimoto

(10) Patent No.: US 6,387,478 B2
(45) Date of Patent: May 14, 2002

(54) COLOR ELECTROPHOTOGRAPHIC IMAGE RECEIVING MATERIAL

(75) Inventor: Hiroshi Fujimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/799,493

(22) Filed: Mar. 7, 2001

(30) Foreign Application Priority Data

Mar. 7, 2000 (JP) ....................................... 2000-062440

(51) Int. Cl.[7] .............................. B32B 7/02; G03G 7/00

(52) U.S. Cl. ....................... 428/215; 428/216; 428/334; 428/336; 428/511; 428/512; 428/513

(58) Field of Search ................................ 428/215, 216, 428/334, 335, 336, 511, 512, 513

(56) References Cited

U.S. PATENT DOCUMENTS 5,691,039 A 11/1997 Rimai et al. ................ 428/195

FOREIGN PATENT DOCUMENTS

| | | |
|---|---|---|
| JP | 63-92965 | 4/1988 |
| JP | 4-212168 | 8/1992 |
| JP | 8-211645 | 8/1996 |

*Primary Examiner*—D. S. Nakarani
(74) *Attorney, Agent, or Firm*—Sughrue Mion, PLLC

(57) ABSTRACT

Provided is a color electrophotographic image receiving material comprising a substrate and a toner image receiving layer provided on at least one surface of said substrate, wherein the substrate comprises a base paper and a 5 to 30 μm thick resin layer having a water vapor permeability not higher than 30 g/($m^2$·24 hr) provided on both surfaces of the base paper, the image receiving layer has a thickness of 3 to 50 μm, and the flow beginning temperature of the image receiving layer $T_{FR}$ and that of the toner $T_{FT}$ satisfy the following relationship:

$$T_{FR} \leqq T_{FT} + 5°\text{ C.} \tag{1}$$

7 Claims, No Drawings

COLOR ELECTROPHOTOGRAPHIC IMAGE RECEIVING MATERIAL

FIELD OF THE INVENTION

The present invention relates to image receiving materials used for outputting color images with electrophotographic printers including laser printers.

BACKGROUND OF THE INVENTION

Color electrophotographic process is widely used in copy machines or computer printers because of its advantages such as dry processing, a high output speed and the capability with which the process can provide final images on general-purpose paper such as plain paper or quality paper.

When, however the process is applied to the reproduction of pictorial images such as portrait or landscape, general-purpose paper cannot behave desirably mainly as it produces prints with a poor surface gloss. In electrophotographic image formation, toner particles are fixed onto an image-receiving paper with the simultaneous application of heat and pressure during image fixing. In order to achieve a flat and smooth print surface with a sufficient level of gloss, toner particles must be embedded well into an image-receiving layer. JP-A-63-92965 (the term "JP-A" as used herein means an "unexamined published Japanese patent application") discloses a method of providing a polymer layer to facilitate toner embedding on the surface of image-receiving materials. Further, JP-A-4-212168 describes a method of providing a polymer layer having a flow beginning temperature lying in a defined range.

However, those techniques have proved not to give a perfect solution to the present problems as the texture or structure of the base paper still tends to appear in the print surface, thus failing in realizing a flat and smooth surface similar to that of conventional photographic prints. Moreover, changes in the surrounding temperature and/or humidity often cause the sheet-formed image receiving material to curl, and sometimes cause toner images to crack.

As a countermeasure for such curl, U.S. Pat. No. 5,691,039 discloses a technique of providing a curl-balancing layer having a melting point note lower than 115° C. on the surface of a base paper opposite to the one on which a toner image receiving layer is formed. This technique can prevent the material from curling, but when the material is placed in highly humid atmospheres, then the base paper elongates by moisture absorption, leading sometimes toner images thereon, which cannot follow such dimensional change, to crack.

Such toner image cracking will be prevented by suppressing the dimensional change of the base material (substrate) due to changes in the surrounding atmospheric condition. The silver halide photographic industry has long been preventing the moisture absorption of paper by laminating polyethylene layers on the both surfaces of base paper. When such type of laminated material is applied simply to electrophotographic image formation, it has been confirmed that toner image tends to migrate onto the fixing means surface during thermal fixing. (Such phenomenon is often called toner offset.) To solve the toner offset problem, one can provide a toner image-receiving layer on such laminated material. JP-A-8-21645, for example, discloses image-receiving materials comprising a base paper both surfaces of which are provided with a thermoplastic resin layer, and a toner image-receiving layer superimposed on such resin layer Such structures have a drawback that a sufficiently high electrostatic field cannot be formed in the toner transfer gap at the toner transfer step, resulting in a poor image transfer. Moreover, at the subsequent fixing step, it is difficult to supply an ample amount of heat to the image-receiving layer as well as the toner image. As a result, the finished print lacks in a high surface gloss equivalent to that of conventional photographic prints.

SUMMARY OF THE INVENTION

This invention has been made by taking into consideration all the above-cited problems; the invention aims to provide color electrophotographic image receiving materials that exhibits a desirable toner transfer feature and that can make prints equivalent to conventional photographic prints as for color reproducibility and surface gloss. The invention also aims to provide color electrophotographic image receiving materials that are highly resistant to environmental changes and thus are free from curling and toner image cracking even when the surrounding atmospheric temperature and humidity change.

The above-cited problems have been solved by a color electrophotographic image receiving material comprising a substrate and a toner image receiving layer provided on at least one surface of said substrate, wherein said substrate comprises a base paper and a 5 to 30 μm thick resin layer having a water vapor permeability not higher than 30 g/($m^2$·24 hr) provided on the both surfaces of said base paper, said image receiving layer has a thickness of 3 to 50 μm, and the flow beginning temperature of said image receiving layer $T_{FR}$ and that of said toner $T_{FT}$ satisfy the following relationship:

$$T_{FR} \leq T_{FT} + 5^\circ\, C. \tag{1}$$

In the color electrophotographic image receiving material of the invention, the flow beginning temperature of said image receiving layer should preferably be lower than the melting point of said resin layer. And, said resin layers should preferably contain polyethylene with a density between 0.94 and 0.97 g/$cm^3$ and have a thickness between 5 and 20 μm. Further, it is preferred to provide, between said resin layer and said image receiving layer, an intermediate layer that can adhere to both of said resin layer and said image receiving layer.

DETAILED DESCRIPTION OF THE INVENTION

A more detailed description on the color electrophotographic image receiving material of the invention will follow.

The color electrophotographic image receiving material of the invention has a toner image receiving layer on at least one surface of a substrate. The characteristics of the material lie in that said substrate consists of a base paper and a resin layer provided on both surfaces of said base paper, said resin layer having a thickness between 5 and 30 μm and having a water vapor permeability not higher than 30 g/($m^2$·24 hr) wherein the flow beginning temperature of said image receiving layer $T_{FR}$ and that of said toner $T_{FT}$ satisfy the above-cited formula (1).

The base paper used for the color electrophotographic image receiving material of the invention may consist of any type of paper provided that it can stand the fixing temperature and has practically acceptable levels of smoothness, whiteness, slipping and frictional property, anti-static property and surface deformation after fixing. Generally speaking, papers and synthetic polymer films used for photographic substrates described in pp. 223 to 240 of *Fundamentals of Photographic Engineering—Silver Halide Photography*, edited by the Society of Photographic Science and Technology of Japan and published by Corona Publishing Co., Ltd. in 1979, are applicable. Practical examples include synthetic paper based on polyolefins or polystyrene, quality paper (wood free paper), art paper, coated paper, cast coated paper, those comprising natural pulp mixed with synthetic polymer fibers made of polyethylene, Yankee paper, baryta paper, wallpaper, backing paper, papers impregnated with synthetic resins or emulsions, synthetic rubber-impregnated paper, synthetic polymer-incorporated paper, cardboards and cellulose fiber paper. In order to achieve a favorable feel as photographic prints, the thickness of such base paper is preferably from 100 to 200 $\mu$m with a density between 0.9 and 1.2 g/cm$^3$.

In the invention, the substrate comprising a base paper provided on each of its front and back surfaces with a resin layer In the case, where an image receiving layer is formed directly on the surface of the base paper, the texture or the rough structure of the base paper appears on the surface of the image receiving layer, which acts to lower the gloss of the toner image. According to the invention in which a resin layer is formed between the base paper and the image receiving layer, the outermost surface has an improved smoothness thus exhibiting a sufficiently high gloss. With a thickness of such resin layer lower than 5 $\mu$m, the smoothing effect exerted by the resin layer is not enough. On the other hand, resin layers thicker than 30 $\mu$m cause various drawbacks. For example, a poor toner transfer takes place at the image transfer procedure leading to poor color reproduction or undesirable decrease of image density. Further, at the image fixing procedure, the resin layer or the toner image fails to accept a sufficient amount of heat, resulting in a noticeable deterioration of surface gloss. From these reasons, the invention limits the thickness of the resin layer between 5 and 30 $\mu$m, preferably between 5 and 25 $\mu$m, more preferably between 7 and 20 $\mu$m.

The resin layer plays an important role of effectively suppressing the change of the moisture content of the base paper. As regards to the suppression of moisture permeation, the thicker the resin layer the better. But, excessively thick resin layers are accompanied by the above-cited drawbacks. Accordingly, moisture permeation should be minimized with a resin layer as thin as possible. The moisture permeability of the resin layer must not exceed 30 g/(m$^2$·24 hr), and more preferable should not exceed 20 g/(m$^2$·24 hr). The water vapor permeability in the present specification is defined as follows. The amount of water vapor permeating one square meter of a 25 A m thick resin layer in 24 hr under the condition of 40° C., 90% RH is first measured, and the measured amount is converted to that for the actual thickness of the resin layer in each image receiving material.

Any material that satisfies all the above-cited conditions can be used for the resin layer of the invention without special exceptions or limitations. The resinous materials forming the resin layer need not always be thermoplastic. Preferable materials are polyolefins such as polyethylene and polypropylene. Particularly, high-density polyethylenes with a density of 0.94 to 0.97 g/cm$^3$ or polypropylenes with a density of 0.85 to 0.95 g/cm$^3$ are preferred because these materials can make the resin layer thin. They are desirably coated on both sides of base paper.

Furthermore, the melting point of the resin layer should preferably be higher than the flow beginning temperature of the image receiving layer in order to feed a sufficient amount of thermal energy to the surface of the image receiving layer during fixing. In the case where the melting point of the resin layer is lower than the flow beginning temperature of the receiving layer, the thermal energy is converted to the latent heat of fusing of the resin layer before the image receiving layer softens well enough to embed toner images therein.

In the invention that utilizes substrates the both surfaces of which are laminated with resin layers, the two resin layer may be the same or different from each other as for material, thickness and water vapor permeability. Each resin layer may consist of a single layer, or two or more layers. Further, in addition to resin layers, other layers may be provided on the base paper so long as such additional layers do not interfere with the purposes of the invention. In those various layers composing the substrate, appropriate additives can be incorporated. Such additives include, for example, whitening agents, electro-conductive agents,. fillers, pigments such as titanium oxide, ultramarine or carbon black, and dyes depending on the needs of specific applications.

To the one or both surfaces of the substrate, a variety of surface treatments or sub-coatings can be applied in order to secure a sufficiently firm adhesion to the layer to be provided thereon. Such treatments include molding to form a glossy surface, embossing to form a fine matt, matt or silky surface disclosed in JP-A-55-26507, and various activations such as those based on corona discharge, flame, glow discharge or plasma. Suitable sub-coating methods include, for example, those disclosed in JP-A-61-846443. The treatments mentioned here can be used solely or in combination, exemplified by embossing followed by surface activation, or surface activation followed by sub-coating.

In the configuration of those substrates, and/or on the front and/or back surface, antistatic agents may be coated comprising semi-conductive metal oxides such as alumina sol or tin oxide, or carbon black dispersed in hydrophilic binder materials. Specifically, those substrates disclosed in JP-A-63-220246 can be used in the invention.

The color electrophotographic image receiving material of the invention has a toner image receiving layer at least on one surface of its substrate. The toner image receiving layer may be provided on the both surfaces of the substrate. Materials having dual receiving layers are suited for use as card, post card, pamphlet or newspaper flier while those with a single receiving layer are suited for use poster, photo print or seal print that has an adhesive coating on the back surface. The toner image receiving layer may consist of two or more layers.

The toner image receiving layer must have such a thermal property as to be readily plasticized in the fixing period and to flow to surround the toner material. In other words, the receiving layer must initiate to flow before toner particles are expanded laterally by the application of heat and pressure. And the inventors of the invention have found that, to achieve such desirable situation, the flow beginning temperatures of the image receiving layer and of the toner must satisfy the relation (1) shown above. In the present specification, the flow beginning temperature is the one measured by Flow Tester CFT-500 of Shimadzu Corporation under the following condition.

Temperature elevating speed: 5° C./min

Weight load: 4 9×10$^6$ Pa

Die hole diameter: 0.5 mm

On the other hand, the fixing temperature must be higher than the higher flow beginning temperature between the receiving layer and the toner.

The thickness of the receiving layer plays an important role to embed the toner sufficiently, and must be in the range of 3 to 50 μm. A preferable range is 5 to 30 μm, and a more preferable one is from 7 to 20 μm. When the thickness is below 3 μm, the receiving layer cannot embed the toner thus failing in achieving a sufficiently high surface gloss. With receiving layers thicker than 50 μm, a poor toner transfer or a poor feel as photographic prints results.

The receiving layer contains a toner acceptive material. Toner acceptive materials to which no special limitation is given include those containing ester linkages, polyurethane resins, polyamide resins such as urea resin, polysulfone resins, poly (vinyl chloride) resins, poly (vinylidene chloride) resins, vinyl chloride/vinyl acetate copolymers, vinyl chloride/vinyl propionate copolymers, polyol resins such aspoly (vinyl butyral), cellulose-based resins such as ethyl cellulose or cellulose acetate, polycaprolactone resin, styrene/maleic anhydride copolymer, polyacrylonitrile resins, polyether resins, epoxy resins, phenol resins, polyolefin resins such as polyethylene or polypropylene, copolymer resins comprising olefins such as ethylene or propylene and other vinyl monomers, and acrylic resins. The receiving layer may comprise a single toner acceptive material or two or more ones in the form of mixture or copolymers.

As the toner acceptive material, compositions containing polyester resins are particularly suited. More preferably, such compositions should contain 20% by weight or more polyester resin. Ester linkage-containing resins include the polycondensation products between dibasic carboxylic acids and alcohols. Suitable dibasic carboxylic acid include terephthalic acid, isophthalic acid, maleic acid, fumaric acid, phthalic acid, adipic acid, sebacic acid, azelaic acid, abietic acid and succinic acid. Each of these dicarboxylic acid may have substituents such as sulfonic acid or a carboxyl moiety. Suitable alcohols include ethylene glycol, diethylene glycol, propylene glycol, bisphenol A, bisphenol S, 2-ethylcyclohexyl dimethanol and neopentyl glycol. Each of these alcohols may have substituents such as a hydroxyl moiety. Other ester linkage-containing resins include acrylate or methacrylate polymers such as poly(methyl methacrylate), poly(butyl methacrylate), poly (methyl acrylate) or poly (butyl acrylate), polycarbonates, poly(vinyl acetate), styrene/acrylate copolymers, styrene/methacrylate copolymers and vinyltoluene acrylate polymers. Specifically, those disclosed in JP-A-59-101395, JP-A-63-7971, JP-A-63-7972, JP-A-63-7973, and JP-A-60-294862. Commercially available products suited for the invention include Vylon 290, Vylon 200, Vylon 280, Vylon 300, Vylon 103, Vylon GK-140 and Vylon GK-130, all made by Toyobo Ltd., Tafuton NE-382, Tafuton U-5, ATR-2009 and ATR-2010, all made by Kao Corporation, Elitel UE3500, UE3210 and XA-8153 all made by Unitika Ltd., and Polyestar TP-220 and R-188 made by The Nippon Synthetic Chemical Industry CO., Ltd.

Those polymer materials must be formulated so as to satisfy the essential conditions of the invention on their thermal characteristics relative to those of the toner to be combined for imaging. Practically, the material compositions of the receiving layer and the toner may be designed by thermal characteristics of polymers to be used for, for example, the resin layer the receiving layer, and by polymer blending or by the use of additives such as inorganic particles or plasticizers.

Plasticizers can be incorporated in the receiving layer and/or in the resin layer composing the color electrophotographic image receiving materials of the invention. The type and quantity of such plasticizers are appropriately chosen by considering its physical and thermal properties and also those of the other ingredients of the layer in concern. The addition level of plasticizer should lie in the range from 0.001 to 90% by weight based on the total quantity (100% by weight) of the binder and other ingredients containing the plasticizer. A more preferable range is from 0.1 to 60% by weight, a particularly preferable range being from 1 to 40% by weight. Suitable plasticizers can be chosen with reference to *Chemistry Handbook*, edited by The Chemical Society of Japan and published by Maruzen Publishers, *Plasticizer, Theory and Application*, edited and written by Koichi Murai and published by Saiwai Shobo, Volumes 1 and 2 of *Studies on Plasticizer*, edited by Polymer Chemistry Association, and *Handbook on Compounding Ingredients for Rubbers and Plastics*, edited by Rubber Digest Co.

As plasticizing agent, materials usually referred to as high boiling point organic solvent or thermal solvent may also be used. Suitable materials include, for example, ester compounds disclosed in JP-A-59-83154, JP-A-59-178451, JP-A-59-178453, JP-A-59-178454, JP-A-59-178455, JP-A-59-178457, JP-A-62-174754, JP-A-62-245253, JP-A-61-209444, JP-A-61-200538, JP-A-62-8145, JP-A-62-9348, JP-A-62-30247, JP-A-62-136646, and JP-A-2-235694, such as esters of the following acids; phthalic, phosphoric, aliphatic, abietic, adipic, sebacic, azelaic, benzoic, lactic, epoxidated aliphatic, glycolic, propionic, trimellitic, citric, sulfonic, carboxylic, succinic, maleic, fumaric, and stearic acid, amides including aliphatic amides and sulfoamides, ethers, alcohols, paraffins, lactones, poly (ethylene oxide) s, silicone oils, and fluorine-containing compounds.

Low molecular weight polymers or oligomers can also be used. Commercially available products include Adekacizer PN-170 and PN-1430 of Asahi Denka Kogyo K.K., PARAPLEX G-25, G-30 and G-40 of C. P. Hall Co., Ester Gum 8L-JA, Ester R-95, Pentalin 4851, FK 115, 4820 and 830, Luisol 28-JA, Picolastic A75, Picotex LC and Crystalex 3086, all made by Rika Hercules Co.

Those materials can be used to control the slipping property leading to the improvement in the transport performance due to friction reduction, improve the offset property during fixing (detachment of toner or layers onto the fixing means) or control the curling property and the charging property for a desirable toner attraction.

In the invention, it is desirable to provide between the receiving layer and the resin layer an intermediate layer that is capable of adhering firmly to the both layers. Such intermediate layer preferably consists mainly of gelatin, poly(vinyl alcohol), polyvinylpyrolidone or carboxymethyl cellulose. A particularly preferable material is gelatin.

The thickness of the intermediate layer should be in the range of 0.05 to 5 μm, and preferably between 0.1 and 2 μm. The intermediate layer effects to prevent the detachment or destruction of the layer or blistering during fixing, and further effectively prevents the cleavage at layer boundaries when the receiving material is folded or when a piece of adhesive tape once adhered to the material surface is stripped off.

In at least one layer composing the electrophotographic image receiving material of the invention, a charge control agent can be incorporated to optimize the transfer and attraction of toner.

Any charge control agent known in the art can be used in the invention, including cationic, anionic, amphoteric and nonionic surfactants, polymer electrolytes and conductive metal oxides. Practical examples include cationic antistatic agents such as quaternary ammonium salts and polyamine derivatives, cation-modified poly(methyl methacrylate), cation-modified polystyrene, anionic ones such as alkyl phophate, anionic polymers and nonionic ones such as aliphatic acid esters. However, the scope of the invention is not limited to the use of those antistatic agents.

Suitable electroconductive metal oxides include ZnO, $TiO_2$, $SnO_2$, $Al_2O_3$, $In_2O_3$, $SiO_2$, MgO, BaO and $MoO_3$. These compounds may be used individually or in combination. Further, composite oxides among them can also be used. Those metal oxides can contain foreign elements; for example, ZnO can be doped with Al or In, $TiO^2$ with Nb or Ta, and $SnO_2$ with Sb or Nb.

The toner image receiving layer should have a surface resistance between $1\times10^6$ and $1\times10^{15}$ at 25° C., 65% RH. When the surface resistance is below $1\times10^6$ Ω, sufficient amount of toner is difficult to be transferred on the receiving layer, leading to low density print images while, with surface resistances exceeding $1\times10^{15}$ Ω, excessive amounts of electrostatic charge generates at toner transfer, also leading to low density images due to a poor toner transfer. Further, with too high surface resistances, static charge tends to generate on the receiving material during material handling. Such charge attracts dusts, causes malfunction in paper feeding including multi feeding, and forms static marks or toner transfer voids during printing operation. The electric resistance of heat-resistant layers comprising water-soluble polymers (described below) needs not always be controlled.

In any of the layers composing the electrophotographic image receiving material of the invention including base paper, water-resistant layer, base paper covering layer, protective layer, image receiving layer, cushion layer, subcoating layer, adiabatic layer, porous layer, heat-resistant layer, adhesive layer and curl balancing layer, photographic additives can be incorporated.

Photographic additives are described, for example, in Research Disclosure Journals (abbreviated as RD hereinafter) Nos. 17643 (December 1978), 18716 (November 1979) and 307105 (November 1989). Descriptions on individual additives are found in the pages listed in Table 1.

TABLE 1

| Kind of additive | RD17643 | PD18716 | RD307105 |
|---|---|---|---|
| Whitening agent | p. 24 | P. 648, right column | p. 868 |
| Stabilizing agent | pp. 24–25 | p. 649, right column | pp. 868–870 |
| Light absorber and UV absorber | pp. 25–26 | p. 649, right column | p. 873 |
| Color image stabilizing agent | p. 25 | p. 650, right column | p. 872 |
| Hardener | p. 26 | p. 651, left column | pp. 874–875 |
| Binder | p. 26 | p. 651, left column | pp. 873–874 |
| Plasticizer and lubricant | p. 27 | p. 650, right column | p. 876 |
| Coating aid and surfactant | pp. 26–27 | p. 650, right column | pp. 875–876 |
| Anti-static agent | p. 27 | p. 650, right column | pp. 876–877 |
| Matting agent | — | — | pp. 878–879 |

In the electrophotographic image receiving material of the invention, finely divided organic and/or inorganic materials (abbreviated as matting agent hereinafter) with the purposes of improving the anti-blocking, slipping, anti-static, separability, whiteness and curling properties. Matting agents can also be used to control the moisture content of the entire receiving material. The particle size of such matting agent should be 0.001 to 50 μm, and more preferably 0.05 to 30 μm. In an expression relative to the thickness of the heat-resistant layer to be described later of 10, the average particle size should be 0.01 to 500, preferably 0.1 to 300 and more preferably 0.5 to 100. The matting agent can be present at the surface of or in the heat-resistant layer. The coated weight of the matting agent lies in the range from 0.001 to 20 $g/m^2$, preferably from 0.003 to 10 $g/m^2$, and more preferably from 0.005 to 5 $g/m^2$.

Any matting agent known in the art can be used for the invention, including, for example, finely divided organic and/or inorganic materials disclosed in JP-A-5-262055. Concretely, in addition to those disclosed in JP-A-63-274944 and JP-A-63-274952 such as particles made of benzoguanamine, polycarbonate and ABS resins, suitable organic matting agents include particles made of the following materials. Melamine resins, melamine-formaldehyde copolymer particles, poly (methyl methacrylate) particles described in p. 29 of JP-A-61-88256, polyolefins such as polyethylene, polystyrene, and cross-linked poly(methyl methacrylate) and polystyrene resins having an improved heat-resistance as well as abrasion resistance. Inorganic matting agents include oxides such as titanium dioxide and silicon dioxide, alkaline earth metal salts such as sulfate or carbonate exemplified by barium sulfate and calcium carbonate, silver halide particles not forming images such as silver chloride or bromide, and glasses.

Any layer composing the electrophotographic image receiving material of the invention can be cross-linked with a cross-linking agent. In the case of cross-linking organic solvent-soluble polymers, thosecross-linking agents disclosed in JP-A-61-199997 and JP-A-58-215398 can be applied. Polyester resins can be preferably cross-linked with isocyanate compounds. In the case of water-soluble polymers, the compounds cited in Table 1 can be used.

The electrophotographic image receiving material of the invention can be incorporated with organic fluorocarbon compounds as coating aid, or with the purposes of improving slipping, anti-static and separability properties. Typical examples of organic fluorocarbon compounds include fluorocarbon-containing surfactants disclosed in the $8^{th}$ to $17^{th}$ columns of Japanese Patent Publication No. JP-B-57-9053, JP-A-61-20944 and JP-A-62-135826, oily fluorocarbon compounds such as fluorocarbon oils, and solid fluorocarbon resins such as tetrafluorinated ethylene resin and various hydrophobic fluorocarbon compounds.

On the back surface of the electrophotographic image receiving material of the invention, a heat-resistant layer can be provided.

Such heat-resistant layer may be made of any material that stands the fixing temperature, and layers containing a water-soluble polymer are preferred particularly at contents not lower than 10% by weight. Suitable materials used as the binder or as a major component of the heat-resistant layer include those mentioned previously for the image receiving layer, water-soluble polymers and other organic solvent-soluble polymers. Among various water-soluble polymers, those containing such moieties that can react with a cross-linking agent to form three-dimensional networks are preferred typically exemplified by poly(vinyl alcohol) and gelatin. The heat-resistant layer may consist of two or more layers. And its thickness lies preferably in the range from 0.01 to 50 μg m, and more preferably from 0.05 to 20 μm.

Any layer composing the electrophotographic image receiving material of the invention can be formed by a suitable coating method known in the art such as blade, air knife, gravure, squeezing, roll, spray, dip or bar coating with the use of a coating mixture that comprises the various ingredients described heretofore and is further added with suitable auxiliary agents if needed and that is dissolved or dispersed in a suitable solvent system.

The electrophotographic image receiving material of the invention can take a variety of forms with no particular limitation as long as the material can be used for electrophotographic imaging. Such forms include cut sheet, belt, web or roll. From the viewpoint of printing efficiency, the form of roll is preferred. To make use of a receiving material roll, the material should preferably be cut to the final print size inside the printer. Thus, printers equipped with a cutter are suited.

Additional examples of the suitable form the electrophotographic image receiving material of the invention can take include photographic prints of L or 2L size, name card containing portraits or pictures, tickets, calendars and photographic prints with decorative frames. One can produce electrophotographic prints having no white edges surrounding the central image area by using the electrophotographic image receiving material of the invention.

In the invention, various types of electrophotographic toners known in the art can be used. It is desirable to form full-color images with yellow, magenta and cyan toners or with those three toners plus black one. Two or more kinds of toner of a single color can be used. Further, a transparent or white toner can also be used.

Special toners may be used including those capable of absorbing UV light or those containing various additives that have been described as the additives for the image receiving layer. For example, by using a toner incorporated with a color fading preventing agent, a toner image provided with an excellent image permanence can be obtained. A specific function may be achieved as the result of reaction of two or more kinds of toners. A toner that has a softening point much higher than that of other toners combinedly used can act as matting agent. Further, by using a combination of toners that differ in their contact angles in melted state with the receiving layer, one can control the spread of each toner during fixing, thus modulating effective density to control tone reproduction characteristics.

Any electrophotographic process known in the art is applicable to the invention without special limitation. Such processes are described in, for example, the first and the second volume of *Fundamentals and Applications of Electrophotographic Technology*, both edited by The Society of Electrophotography of Japan and published by Corona Publishing Co., Ltd. No special limitation on the type of toner or on the process to be used in the invention is imposed.

EXAMPLES

The invention is further described more in detail with reference to the following examples and test results. The materials, the amounts and ratios of those materials used, processing methods, and the order of processing can be altered within the scope of the invention. Accordingly, the invention is not limited to the following examples at all.

Example 1

The both surfaces of a piece of base paper comprising chemical pulp having a thickness of 140 μm and a basis weight of 150 g/m$^2$ were laminated with high density polyethylene having a densitiy of 0.95 g/cm$^3$ and a melting point of 130° C. so that the two laminated resin layers have the same thickness. The thickness of the resin layer was changed from sample to sample as shown in Table 2. The water vapor permeability of each resin layer is also shown in the table. Then, the following intermediate layer was coated on the resin layer so as to have 0.2 μm thickness at the both surfaces. Next, one surface of the intermediate layer was coated with the following image receiving layer, and the other with the following matte layer so as to have 2 μm thickness. In this manner, a color electrophotographic image receiving material resulted. The types of the resins used in and the thickness of the receiving layer were changed as shown in Table 2. The receiving layer of each sample had a flow beginning temperature shown in the table.

| | |
|---|---|
| <Coating mixture for the intermediate layer> | |
| gelatin | 50 parts by weight |
| salicylic acid | 50 parts by weight |
| water | 1000 parts by weight |
| methanol | 1500 parts by weight |
| <Coating mixture for the image receiving layer> | |
| a polyester resin (See Table 2.) | 100 parts by weight |
| titanium dioxide (Tipaque ™ A-220 made by Ishihara Sangyo Kaisha Ltd.) | 15 parts by weight |
| $(C_6H_5O)_3$—P═O | 9 parts by weight |
| methyl ethyl ketone | 400 parts by weight |
| <Coating mixture for the matte layer> | |
| Vylonal MD1200 (a product of Toyobo Co., Ltd.) | 100 parts by weight |
| Epostar L15 (a product of Nippon Shokubai Co. Ltd.) | 30 parts by weight |
| water | 450 parts by weight |

Each color electrophotographic image receiving material thus prepared was cut to A4 size, and the resulting sheet was fed to a color laser printer, Docucolor 1250 made by Fuji Xerox Co., Ltd. The printer output a photographic image, whose digital data had been imported in the printer via reading the original image with a scanner, under an atmospheric environment of 25° C. and 50% RH. The toner having a flow beginning temperature of 96° C. was used.

The gloss of the solid black area of the resulting print formed with the color electrophotographic image receiving material was measured in 45° direction with a gloss meter. Further, the print was left under 28° C., 85% RH atmosphere for 24 hr, and then returned to 25° C., 50% RH atmosphere to visually examine crack formation in toner images. The level of toner cracking was evaluated according to the following criterions.

A: No crack is found by visual inspection.
B: A few cracks are observed.
C: Crack formation is evident.

TABLE 2

| | Resin layer | | Image receiving layer | | | Evaluation | | |
|---|---|---|---|---|---|---|---|---|
| Sample No. | Thickness (μm) | Water vapor permeability ($g/m^2 \cdot 24$ hr) | Resin (Polyester) | Flow beginning temp. (° C.) | Thickness (μm) | Gloss level | Toner cracking | Note |
| 1 | 3 | 80 | A | 93 | 10 | 52 | C | Comparative Example |
| 2 | 7 | 34 | A | 93 | 10 | 70 | C | Comparative Example |
| 3 | 10 | 24 | A | 93 | 10 | 83 | A | This invention |
| 4 | 15 | 16 | A | 93 | 10 | 80 | A | This invention |
| 5 | 15 | 16 | A | 93 | 5 | 68 | A | This invention |
| 6 | 15 | 16 | A | 93 | 2 | 44 | A | Comparative Example |
| 7 | 15 | 16 | A | 93 | 30 | 70 | A | This invention |
| 8 | 15 | 16 | A | 93 | 55 | 53 | A | Comparative Example |
| 9 | 15 | 16 | A | 98 | 10 | 80 | A | This invention |
| 10 | 15 | 16 | B | 100 | 10 | 76 | A | This invention |
| 11 | 15 | 16 | C | 103 | 10 | 48 | A | Comparative Example |
| 12 | 20 | 12 | D | 93 | 10 | 77 | A | This invention |
| 13 | 31 | 8 | A | 93 | 10 | 56 | A | Comparative Example |
| 14 | 35 | 6 | A | 93 | 10 | 50 | A | Comparative Example |

Polyester A: Tafuton U-5 of Kao Corporation
Polyester B: Tafuton U-3 of Kao Corporation
Polyester C: a copolymer comprising terephthalic acid, isophthalic acid and ethylene glycol
Polyester D: a copolymer comprising terephthalic acid, isophthalic acid with bisphenol A and ethylene glycol As is evident from Table 2, resin layers thinner than 5 μm have an insufficient surface smoothness, leading to a low gloss level and crack formation in image areas under highly humid conditions (Sample No. 1). With resin layers 5 μm thick or more, cracks form in toner images for the case where the water vapor permeability exceeds 30 $g/(m^2 \cdot 24$ hr) (Sample No 2). In contrast, with resin layers thicker than 30 μm, again the gloss level deteriorates due to a poor heat transfer to toner during fixing, leading to incomplete toner embedding into the receiving layer (Sample Nos. 13 and 14). Accordingly, the resin layer should preferably have a thickness of 10 to 20 μm.

Besides, in the case where the flow beginning temperature of the receiving layer is higher than that of the toner by 5° C. or more, toner embedding is also incomplete leading to a low gloss level (Sample No. 11). In contrast, with samples in conformity with the invention, favorable results are obtained as desirable levels of gloss are achieved without causing toner images to crack even when the surrounding condition is drastically altered (Sample Nos. 3, 4, 5, 7, 9, 10 and 12).

Example 2

Instead of the high density polyethylene used in the resin layer of Example 1, various resins different in water vapor permeability and melting point were used. The resins and their properties are listed in Table 3. Each of the resins was coated to provide a 20 μm thick resin layer, on which a 10 μm thick receiving layer comprising Polyester A. Except those two alterations, the procedures in Example 1 were repeated to prepare color electrophotographic image receiving materials. The evaluation of the materials was also carried out as in Example 1 with the results shown in Table 3.

TABLE 3

| | | Resin layer | | Evaluation | | |
|---|---|---|---|---|---|---|
| No. | Resin | Water vapor permeability ($g/m^2 \cdot 24$ hr) | Melting point (° C.) | Gloss level | Crack | Note |
| 21 | PE with 0.955 density | 12 | 130 | 76 | A | This invention |
| 22 | Polypropylene | 22 | 170 | 75 | A | This invention |
| 23 | Polyester E | 60 | 85 | 43 | C | Comparative example |
| 24 | PE with 0.914 density | 60 | 107 | 68 | C | Comparative example |

PE: abbreviation for polyethylene
Polyester E: ER-8110 of Nippon Ester Co., Ltd.

Table 3 shows that, with receiving materials having a resin layer with a water vapor permeability not lower than 30 $g/(m^2 \cdot 24$ hr), toner images tend to crack after image formation with changes in the condition (Sample Nos. 23 and 24) On the other hand, in cases where the water vapor permeability of the resin layer does not exceed 30 $g/(m^2 \cdot 24$ hr), toner images thereon will not crack (Sample Nos. 21 and 22).

Furthermore, in cases where the melting point of the resin layer is higher than the flow beginning temperature of the image receiving layer (93° C.), a sufficiently high level of gloss level is obtained. Particularly, with the melting point not lower than 110° C. of the resin layer, excellent gloss levels can be obtained (Sample Nos. 21 and 22).

Example 3

The procedures, of Example 2 were repeated to prepare Sample Nos. 31 to 33 of the image receiving material except that the intermediate layer of Sample Nos. 21 to 23 was omitted. The resulting samples of color electrophotographic image receiving material were exposed in the atmosphere of 10° C., 15% RH for 24 hr, and then to another atmosphere of 28° C., 85% RH for another day. Then, a piece of cellophane tape was adhered on the surface of the receiving layer of each sample and then peeled off to evaluate the adhesive strength of the receiving layer. The degree of adhesive strength was evaluated according to the following criterions.

A: No transfer of the receiving layer and of the resin layer onto the tape take place.

B: An opaque powdery material is observed on the peeled tape, and a sign of tape adhesion remains on the surface of the receiving layer.

C: Some deposits are readily found on the stripped tape while part of the receiving layer is peeled off.

TABLE 4

| No. | Resin used in the resin layer | Intermediate layer | Adhesive strength |
|---|---|---|---|
| 21 | PE with 0.955 density | Provided | A |
| 31 | PE with 0.955 density | Not provided | C |
| 22 | Polypropylene | Provided | A |
| 32 | Polypropylene | Not provided | C |
| 23 | Polyester E | Provided | A |
| 33 | Polyester E | Not provided | B |

PE: abbreviation for polyethylene
Polyester E: ER-8110 of Nippon Ester Co., Ltd.

As is evident from Table 4, the introduction of the intermediate layer effectively prevented the peel-off of the surface layer. In particular, when the resin layer had a melting point lower than 110° C., it was confirmed that such favorable effect of the intermediate layer is prominent (Sample Nos. 21 and 22).

Bleached hardwood sulfate pulp was beaten at 4% consistency to give 35° SR beating grade. To a suspension containing 70 parts by weight of the pulp, the following ingredients were added.

| | |
|---|---|
| a cationic starch | 0.5 part by weight |
| an amphoteric polyacrylamide | 1.0 part by weight |
| alkylketene dimmer | 0.6 part by weight |
| a polyamide-polyamine-epichlorohydrin resin | 1.0 part by weight |
| an epoxidated aliphatic acid amide | 0.1 part by weight. |

The resulting suspension was charged in a paper machine to give rise to a base paper with 170 g/m$^2$ basis weight. Each of the both paper surfaces was laminated with a layer having either of the following compositions. The weight of the laminated layer was 30 g/m$^2$ for the front surface, and 26 g/m$^2$ for the back surface, respectively. The densities of the four kinds of low density polyethylene were set to the values listed in Table 5.

| | |
|---|---|
| <Front surface> | |
| a low density polyethylene of density a | 58 parts by weight |
| a low density polyethylene of density b | 27.73 parts by weight |
| rutile type $TiO_2$ | 17.73 parts by weight |
| Ultramarine Blue | 0.2 part by weight |
| an anti-oxidant | 0.2 part by weight |
| a metal salt of stearic acid | 0.07 part by weight |
| Cobalt Violet | 0.07 part by weight |
| <Back surface> | |
| a low density polyethylene of density c | 70 parts by weight |
| a low density polyethylene of density d | 30 parts by weight |

Then, an image receiving layer was formed on the polyethylene layer. The types of polymer used in the receiving layer in 1 g/m$^2$ are shown in Table 5 together with the thickness of the receiving layer.

After stored under the storage condition of 25° C., 50% RH for 2days, the resulting color electrophotographic image receiving materials were subjected to image recording with a color laser printer (Docucolor 1250 made by Fuji Xerox Co., Ltd.) under the condition of 32° C., 85% RH.

The degree of curling was evaluated by placing each sample of the imaged receiving material on a flat desk. The degree of curling was expressed by the averaged height from the desktop to the four corners of A4 sheet placed with its convex plane down. Cracks in the toner image were inspected visually. The density of black areas was measured to evaluate the situation of toner transfer.

Another piece of each sample was stored under the storage condition of 25° C., 50% RH for 2 days, and then subjected to image recording with a color laser printer (Docucolor 1250 made by Fuji Xerox Co., Ltd.) under a cold condition of 10° C. The gloss level of the toner image was measured with a gloss meter to give the results shown in Table 5.

TABLE 5

| | Resin layer | | | | | | Receiving layer | | Evaluation | | | |
|---|---|---|---|---|---|---|---|---|---|---|---|---|
| | Polyethylene density (g/cm$^3$) | | | | Water vapor permeability (g/m$^2$ · 24 hr) | | | Thickness | Curling | | Gloss | |
| No. | a | b | c | d | Front | Back | Polymer | (μm) | (mm) | Crack | level | Note |
| 41 | 0.924 | 0.935 | 0.950 | 0.924 | 46 | 18 | I | 1 | 30 | C | 44 | Comparative example |
| 42 | 0.950 | 0.924 | 0.950 | 0.924 | 18 | 18 | I | 1 | 5 | B | 45 | Comparative example |
| 43 | 0.924 | 0.935 | 0.950 | 0.924 | 46 | 18 | I | 8 | 30 | C | 53 | Comparative example |

TABLE 5-continued

| | Resin layer | | | | | | Receiving layer | | | | | |
|---|---|---|---|---|---|---|---|---|---|---|---|---|
| | Polyethylene density (g/cm³) | | | | Water vapor permeability (g/m² · 24 hr) | | | Thick-ness | Evaluation | | | |
| No. | a | b | c | d | Front | Back | Polymer | (μm) | Curling (mm) | Crack | Gloss level | Note |
| 44 | 0.950 | 0.924 | 0.950 | 0.924 | 18 | 18 | Polyester A | 1 | 6 | B | 48 | Comparative example |
| 45 | 0.950 | 0.924 | 0.950 | 0.924 | 18 | 18 | Polyester A | 8 | 4 | A | 73 | This invention |
| 46 | 0.950 | — | 0.950 | — | 16 | 16 | Polyester B | 12 | 4 | A | 72 | This invention |

I: a carboxylated styrene-butadiene copolymer

As is evident in Table 5, in the case where the density of the polyethylene used in the surface layer is low, the water vapor permeability is large, causing toner image to crack easily (Sample No. 41). Also, thin receiving layers lead to insufficient gloss level.

Further, a desirably high gloss cannot be realized by using a high density polyethylene on the front surface if the thickness of the receiving layer is small (Sample Nos. 42 and 44) Even with a receiving layer as thick as 8 μm, toner images thereon tend to crack in the cases where the water vapor permeability is high (Sample No. 43).

In contrast, desirable performance is achieved in cases where the water vapor permeability of the polyethylene layer is low, and where the thickness of the receiving layer lies in the range defined by the present invention (Samples Nos. 45 and 46).

Example 5

On the back surface of Sample No. 45 in Example 4 was coated the following mixture for a matte layer so as to give a coated thickness of 10 μm. The performance of the resulting receiving material was evaluated as in Example 4 to prove that it behaves satisfactorily.

| <Coating mixture for the matte layer> | |
|---|---|
| Vylonal MD1930 (a product of Toyobo Co., Ltd.) | 90 parts by weight |
| Sylysia 440 (a product of Fuji Sylysia Chemical Ltd.) | 14 parts by weight |
| Epostar L15 (a product of Nippon Shokubai Co., Ltd.) | 9 parts by weight |
| water | 57 parts by weight |
| ethanol | 30 parts by weight |

The color electrophotographic image receiving material of the invention is provided with an excellent toner transfer property as well as an superior color reproduction capability. The color electrophotographic image receiving material of the invention will neither curling nor generate cracks in toner images under wide changes in the temperature and/or humidity of the surrounding atmosphere.

While the invention has been described in detail and with reference to specific embodiments thereof, it will be apparent to one skilled in the art that various changes and modifications can be made therein without departing from the spirit and scope thereof.

This application is based on Japanese patent application No. 2000-62440 filed on Mar. 7, 2000, the entire contents of which incorporated herein by reference.

What is claimed is:

1. A color electrophotographic image receiving material comprising a substrate and a toner image receiving layer provided on at least one surface of said substrate, wherein said substrate comprises a base paper and a 5 to 30 μm thick resin layer having a water vapor permeability not higher than 30 g/(m²·24 hr) provided on both surfaces of said base paper, said image receiving layer has a thickness of 3 to 50 μm, and the flow beginning temperature of said image receiving layer $T_{FR}$ and that of said toner $T_{FT}$ satisfy the following relationship:

$$T_{FR} \leqq T_{FT} + 5^\circ\ C. \tag{1}$$

2. The color electrophotographic image receiving material of claim 1, wherein the flow beginning temperature of said image receiving layer is lower than the melting point of said resin layer.

3. The color electrophotographic image receiving material of claim 1, wherein said resin layers provided on the both surfaces each include polyethylene having a density of 0.94 to 0.97 g/cm³ and have a thickness of from 5 to 20 μm.

4. The color electrophotographic image receiving material of claim 1, wherein an intermediate layer capable of adhering to both of said resin layer and said imager receiving layer is provided between said resin layer and said image receiving layer.

5. The color electrophotographic image receiving material of claim 1, wherein said resin layer has a water vapor permeability not higher than 20 g/($m_2$·24 hr).

6. The color electrophotographic image receiving material of claim 1, wherein said image receiving layer has thickness of 5 to 30 μm.

7. The color electrophotographic image receiving material of claim 1, wherein said image receiving layer has thickness of 7 to 20 μm.

* * * * *